MAGNETIC SYSTEMS

Filed May 1, 1957 13 Sheets-Sheet 1

INVENTORS
GEORGE R. BRIGGS &
ARTHUR W. LO
BY Morris A. Lablein
ATTORNEY

INVENTORS
GEORGE R. BRIGGS &
ARTHUR W. LO
BY
ATTORNEY

INVENTORS
GEORGE R. BRIGGS &
ARTHUR W. LO
BY Morris L. Rabkin
ATTORNEY

INVENTORS
GEORGE R. BRIGGS &
ARTHUR W. LO
BY Morris [signature]
ATTORNEY

INVENTORS
GEORGE R. BRIGGS &
ARTHUR W. LO
BY Morris ... [signature]
ATTORNEY

INVENTORS
GEORGE R. BRIGGS &
ARTHUR W. LO
BY Morris A. Rabkin
ATTORNEY

MAGNETIC SYSTEMS

Filed May 1, 1957 13 Sheets-Sheet 7

INVENTORS
GEORGE R. BRIGGS &
ARTHUR W. LO
BY Morris A. Rabin
ATTORNEY

Jan. 17, 1961 G. R. BRIGGS ET AL 2,968,795

MAGNETIC SYSTEMS

Filed May 1, 1957 13 Sheets-Sheet 8

INVENTORS
GEORGE R. BRIGGS &
ARTHUR W. LO

BY

ATTORNEY

INVENTORS
GEORGE R. BRIGGS &
ARTHUR W. LO
BY
Morris L. Rahan
ATTORNEY

INVENTORS
GEORGE R. BRIGGS &
ARTHUR W. LO
BY Morris Rabkin
ATTORNEY

INVENTORS
GEORGE R. BRIGGS &
ARTHUR W. LO

BY Morris Rabkin

ATTORNEY

INVENTORS
GEORGE R. BRIGGS &
ARTHUR W. LO
BY Morris L. Rabkin
ATTORNEY

INVENTORS
GEORGE R. BRIGGS &
ARTHUR W. LO

BY Morris L. Rabkin

ATTORNEY 2,968,795

MAGNETIC SYSTEMS

George R. Briggs, Princeton, and Arthur W. Lo, Fords, N.J., assignors to Radio Corporation of America, a corporation of Delaware Filed May 1, 1957, Ser. No. 656,027

20 Claims. (Cl. 340—174)

This invention relates to magnetic systems of the shift register type, and particularly to shift register type circuits using transfluxors.

An article by J. A. Rajchman and A. W. Lo, entitled "The Transfluxor," and published in the March 1956 issue of the I.R.E., pages 321–332, describes the construction and the operation of transfluxor devices. A transfluxor includes a core of rectangular hysteresis loop magnetic material, having two or more apertures, and may be arranged to provide substantially complete electrical isolation between various windings linked to the transfluxor core. Because of the electrical isolation between these various windings, shift register type circuits using transfluxors may be provided which use relatively simple transfer loops between the various register stages.

It is among the objects of the present invention to provide improved shift register type circuits.

Another object of the present invention is to provide improved shift register type circuits in which relatively simple transfer loops are used for coupling the various register stages.

Still another object of the present invention is to provide efficient shift register circuits which may, if desired, dispense with the use of any unidirectional coupling elements between the various register stages.

According to the present invention, a plurality of transfluxors are connected in cascade by a plurality of transfer circuits each linking one transfluxor to a succeeding transfluxor. One or more shift lines are linked to the transfluxors for shifting a stored pattern of information. One or more priming lines also are linked to the transfluxors. The priming lines are used for establishing such flux patterns in the transfluxors that the shift operations do not produce undesired transfer currents in the transfer circuits.

A feature of the invention is the application of holding magnetizing forces to the transfluxors during the priming operation. The holding magnetizing forces are used to inhibit undesired flux changes in the transfluxors during the priming operation.

Various embodiments of the invention are described. In certain embodiments, two-apertured transfluxor cores are used, and in other embodiments three-apertured transfluxor cores are used. Some embodiments of the invention include multiple shift lines and a single priming line; others include multiple priming and multiple shift lines, and still others include multiple priming lines and a single shift line.

In the accompanying drawings:

Fig. 1 is a schematic diagram of a shift register according to the invention, using two-apertured transfluxor cores;

Figs. 2 through 5, respectively, are each schematic diagrams illustrating flux patterns in one of the transfluxor cores of Fig. 1 during different portions of the operating cycle.

Fig. 7 is another embodiment of a shift register according to the invention, using two-apertured transfluxor cores;

Figure 12:
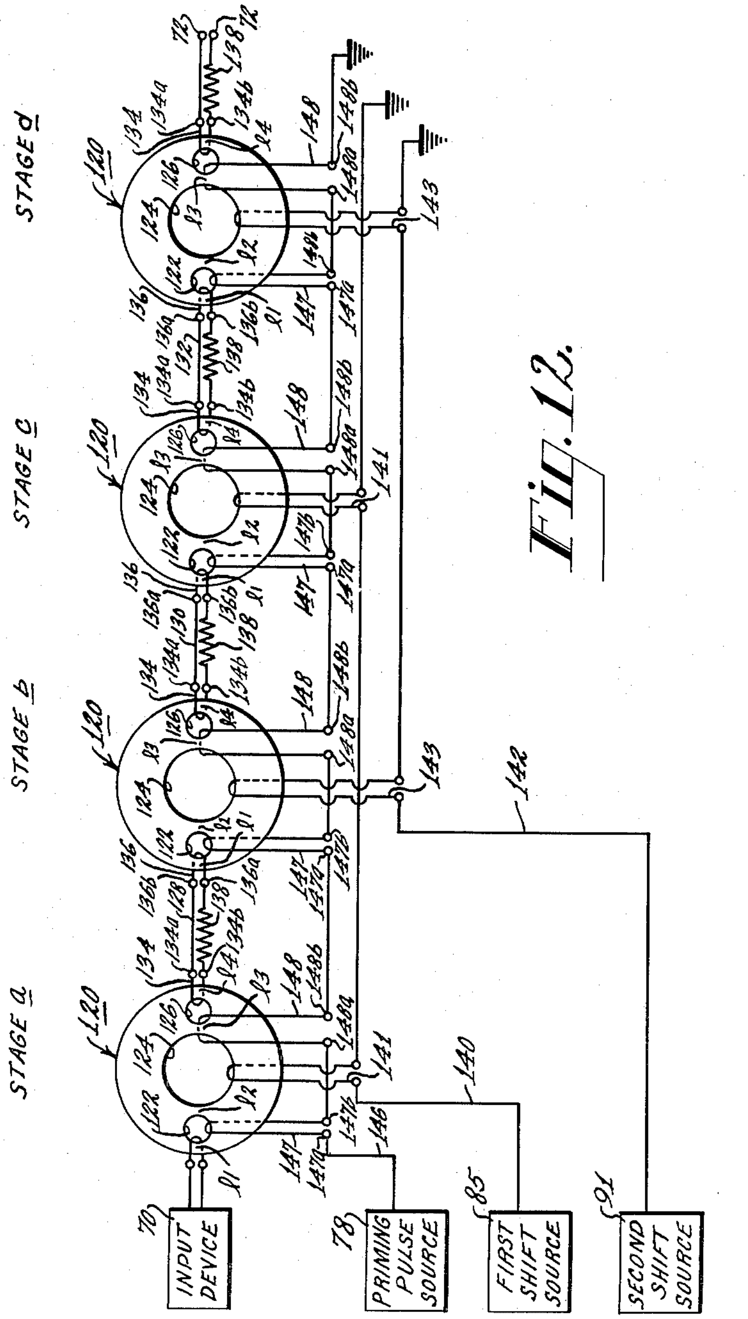
Fig. 12 is a schematic diagram of the shift register according to the invention, using three-apertured transfluxor cores.
Figure 17:
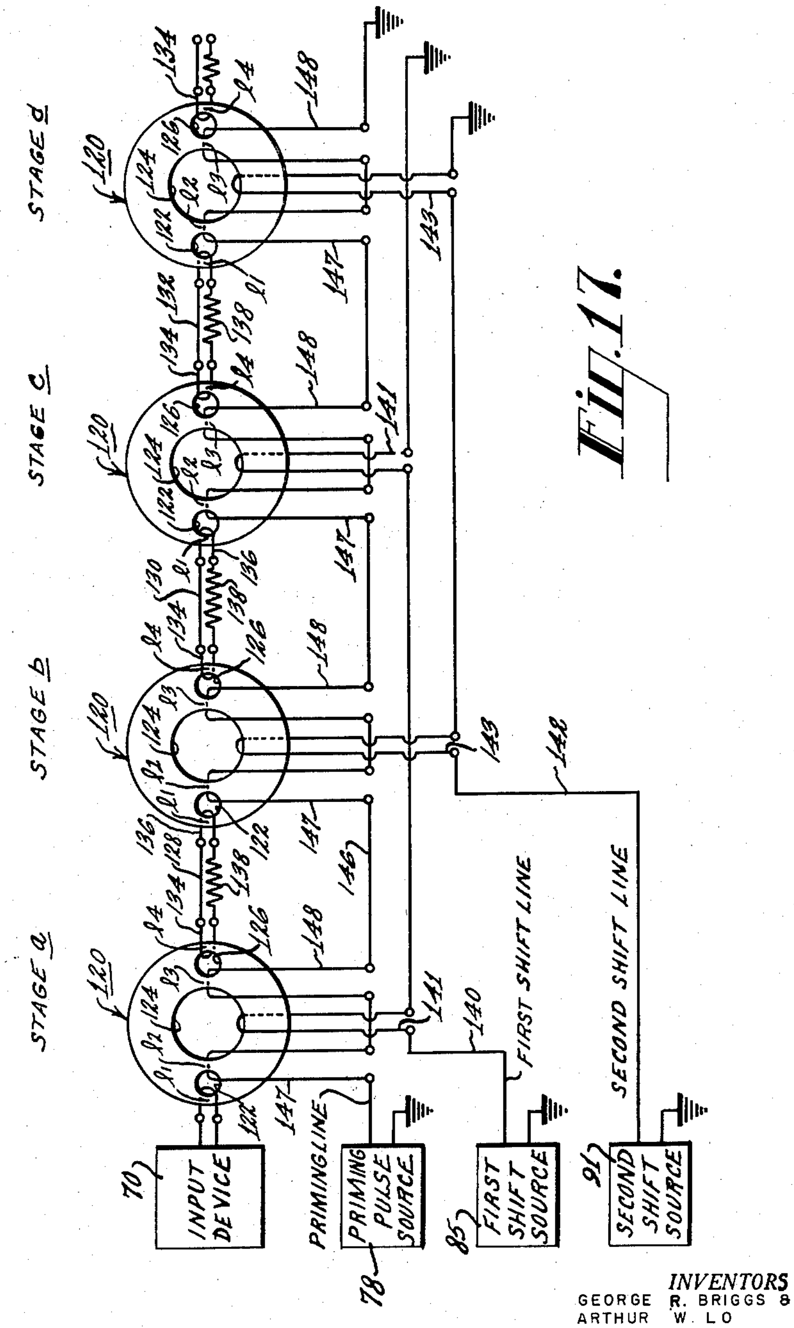
Figure 22:
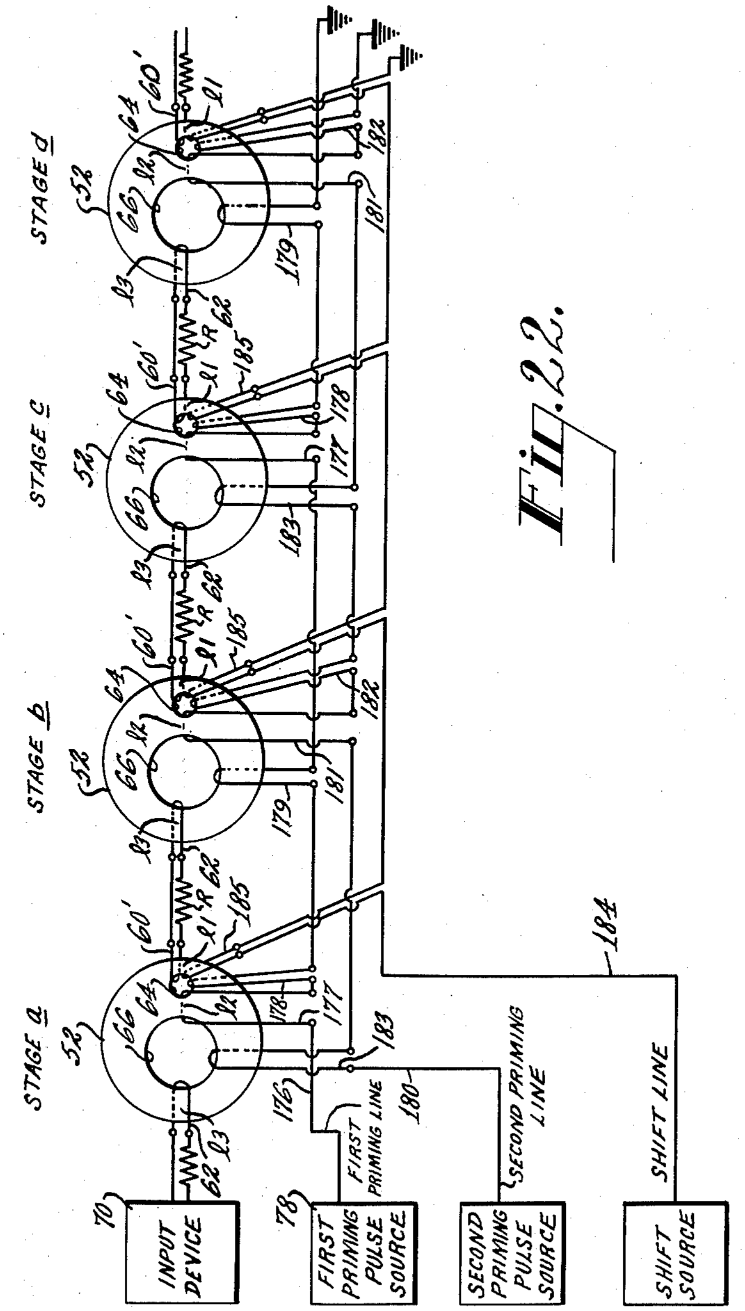
Figure 28:
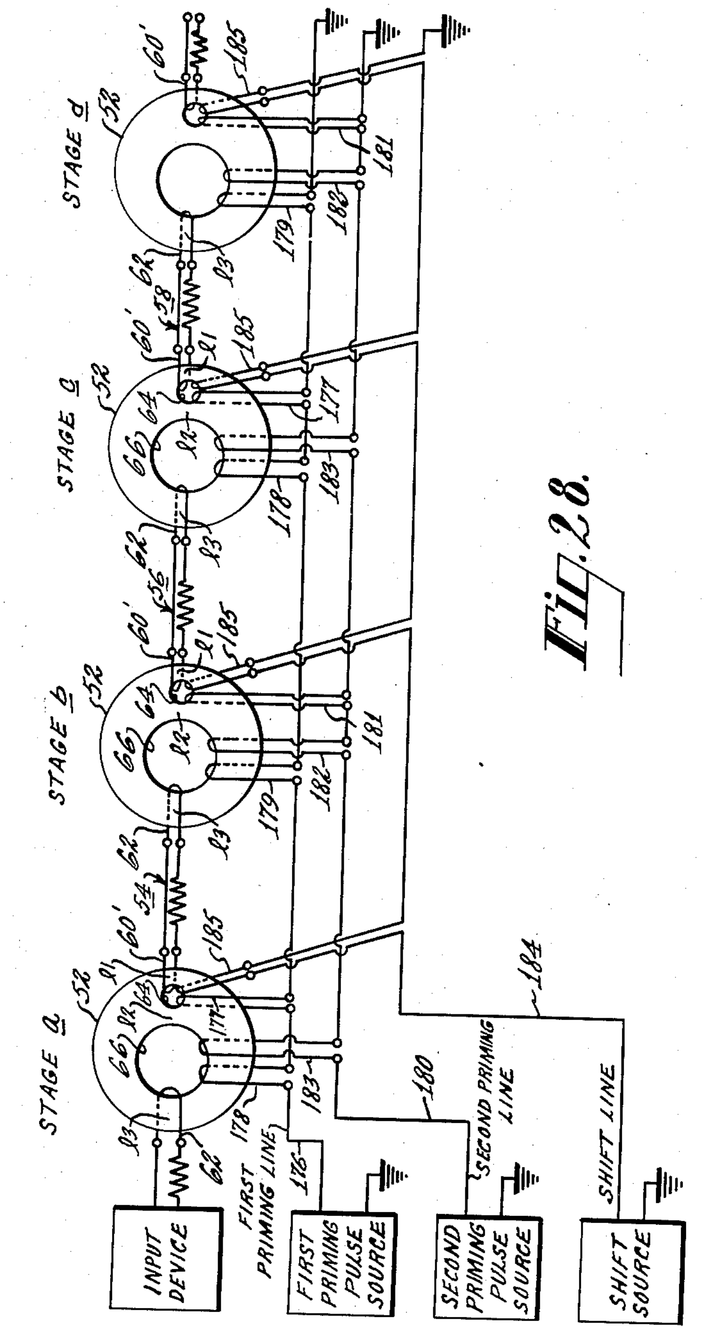

Figs. 13 through 16, respectively, are each a schematic diagram of a transfluxor core of Fig. 12 and illustrating various flux patterns in that core during different portions of the operating cycle;

Fig. 17 is a schematic diagram of a shift register circuit according to the invention, using three-apertured transfluxor cores and having a priming line linking both the central legs of all the cores;

Figs. 18 through 21, respectively, are each a schematic diagram of a transfluxor core of Fig. 17 and illustrating various flux patterns in that core during different portions of the operating cycle;

Fig. 22 is a schematic diagram of a shift register according to the invention, using two-apertured transfluxor cores and using multiple priming lines and a single shift line;

Figs. 23 through 27, respectively, are each a schematic diagram of a core of Fig. 22, and illustrating various flux patterns established in that core during different portions of the operating cycle; and Fig. 28 is a schematic diagram of another embodiment of a shift register according to the invention, using two-apertured transfluxor cores and using multiple priming lines and a single shift line.

Figure 1:
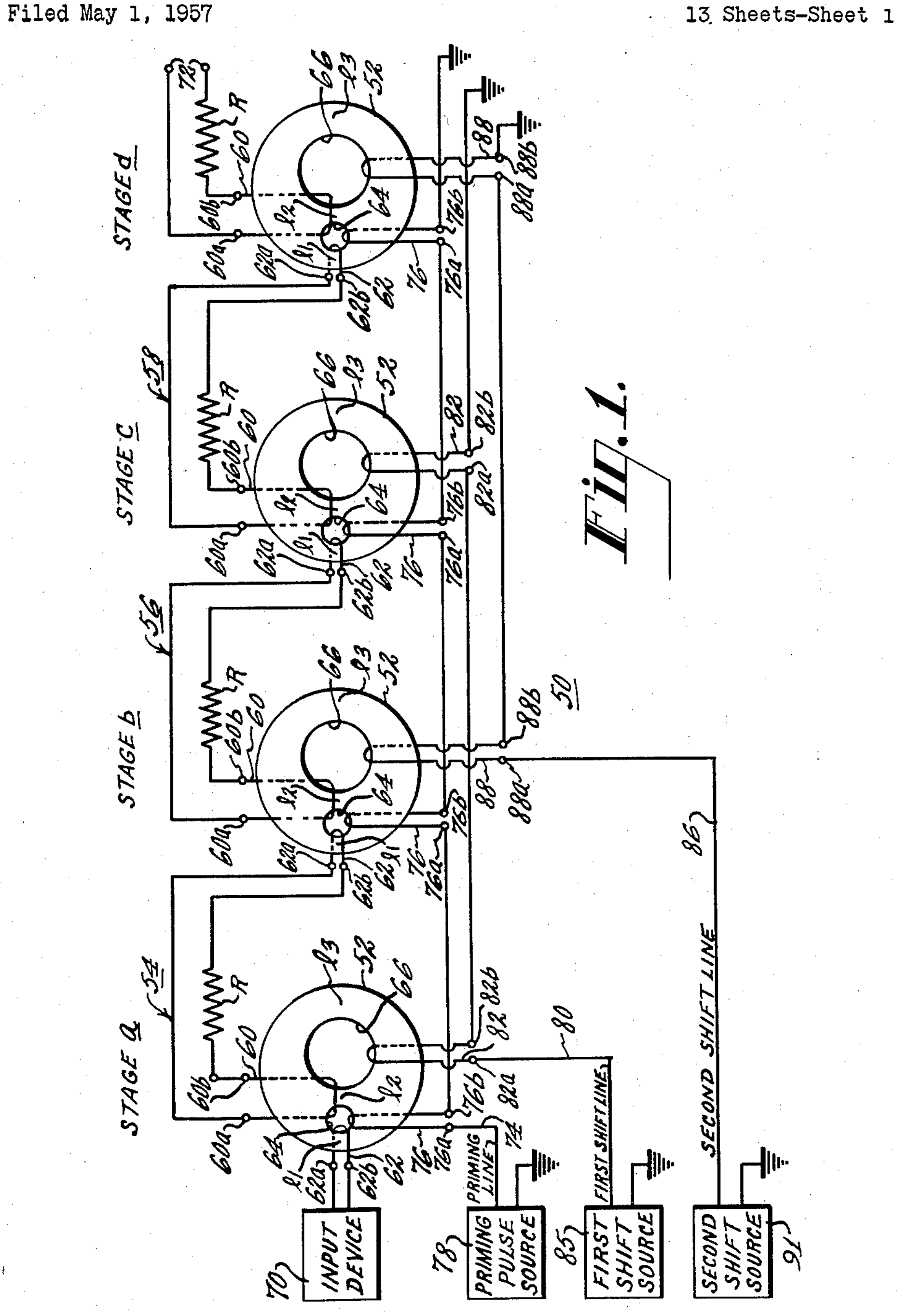

The shift register 50 of Fig. 1 has four stages, *a*, *b*, *c* and *d*, each including a separate two-apertured core 52. Each core 52 is similar to the transfluxor core of Fig. 3 of the aforementioned article, and has a smaller aperture 64 and a larger aperture 66. Three transfer loops 54, 56 and 58 are used to couple the cores 52 of the stages *a*, *b*, and *c* to those of stages *b*, *c*, and *d*, respectively. Each transfer loop is similar to the other, and each includes in series an output winding 60 of one core 52, an input winding 62 of a succeeding core 52, and a resistance element R connected between these windings. The resistance element R may be any suitable element having substantially equal bidirectional current-carrying characteristics. The resistance element R may have a linear or a non-linear voltage-current characteristic.

Each output winding 60 is wound on the middle leg $l_2$ of a different core 52. Beginning at one terminal 60*a*, an output winding 60 is brought across the bottom surface of a core 52, then upwardly through the smaller aperture 64, then across the top surface of the core 52, then downwardly through the larger aperture 66, and then back across the bottom surface of the core 52 to the terminal 60*b*. Each input winding 62, beginning at one terminal 62*a*, is brought across the bottom surface of a core 52, then upwardly through the smaller aperture 64, and then across the top surface of the core 52 to the terminal 62*b*. Each transfer loop is completed by directly connecting the terminal 60*a* of an output winding 60 to the terminal 62*a* of an input winding 62, and by connecting the other terminals 60*b* and 62*b* to each other through the resistance element R.

The input winding 62 of the stage *a* core 52 is connected to a source of input signals, such as an input device 70. The output winding 60 of the stage *d* core 52 is connected to a pair of output terminals 72. The output terminals 72 may be connected to any suitable utilization device (not shown), or they may be connected to the input winding 62 of a core 52 of a further stage (not shown) of a shift register having five or more stages. Alternatively, the output terminals 72 may be connected back to the input winding 62 of the core 50 of the stage *a*, as in a ring counter circuit. Each core 52 is linked by a separate priming winding 76. Beginning at one terminal **76*a*, each priming winding 76 is brought across the top surface of its associated core 52, then downwardly through the smaller aperture 64, and then across the bottom surface of that core 52 to the terminal 76*b*. A priming line 74 is formed by connecting the terminal 76*b* of each priming winding 76 to the terminal 76*a* of the succeeding priming winding 76**, and so on. After linking the stage *d* core 52, the priming line 74 is connected at one end to a common source of reference potential, indicated in the drawing by the conventional ground symbol. At its other end, the priming line 74 is connected to one output terminal of a source of priming signals, such as a priming source 78 which has another terminal connected to ground.

A first shift line 80 is linked to the cores 52 of the alternate stages *a* and *c* by means of first shift windings 82. Beginning at one terminal **82*a*, each first shift winding 82 is brought across the top surface of its associated core 52, downwardly through the larger aperture 66, and then across the bottom surface of the core 52 to the other terminal 82*b*. The terminal 82*b* of one first shift winding 82 is connected to the terminal 82*a* of a succeeding first shift winding 82, and so on. At one end terminal, after linking the last core 52, the first shift line 80 is connected to ground. At its other end terminal, the first shift line 80 is connected to one output terminal of a first shift source 85** which has another output terminal connected to ground.

In a manner similar to the linking of the first shift line 80 to the first alternate stages *a* and *c*, a second shift line 86 is linked to the cores 52 of the other alternate stages *b* and *d* by means of second shift windings 88. At one end terminal, after linking the cores 52, the second shift line 86 is connected to ground. The second shift line 86 receives second shift pulses from an output terminal of a second shift pulse source 91 which has another terminal connected to ground. The input device 70, the priming source 78, and the first and second shift sources 85 and 91 are preferably constant-current sources, such as other magnetic cores or pentode tube amplifier circuits. For convenience of drawing, each of the windings is shown as a single-turn winding. However, multi-turn windings may be employed.

Figures 2, 3, 4, 5, 6:
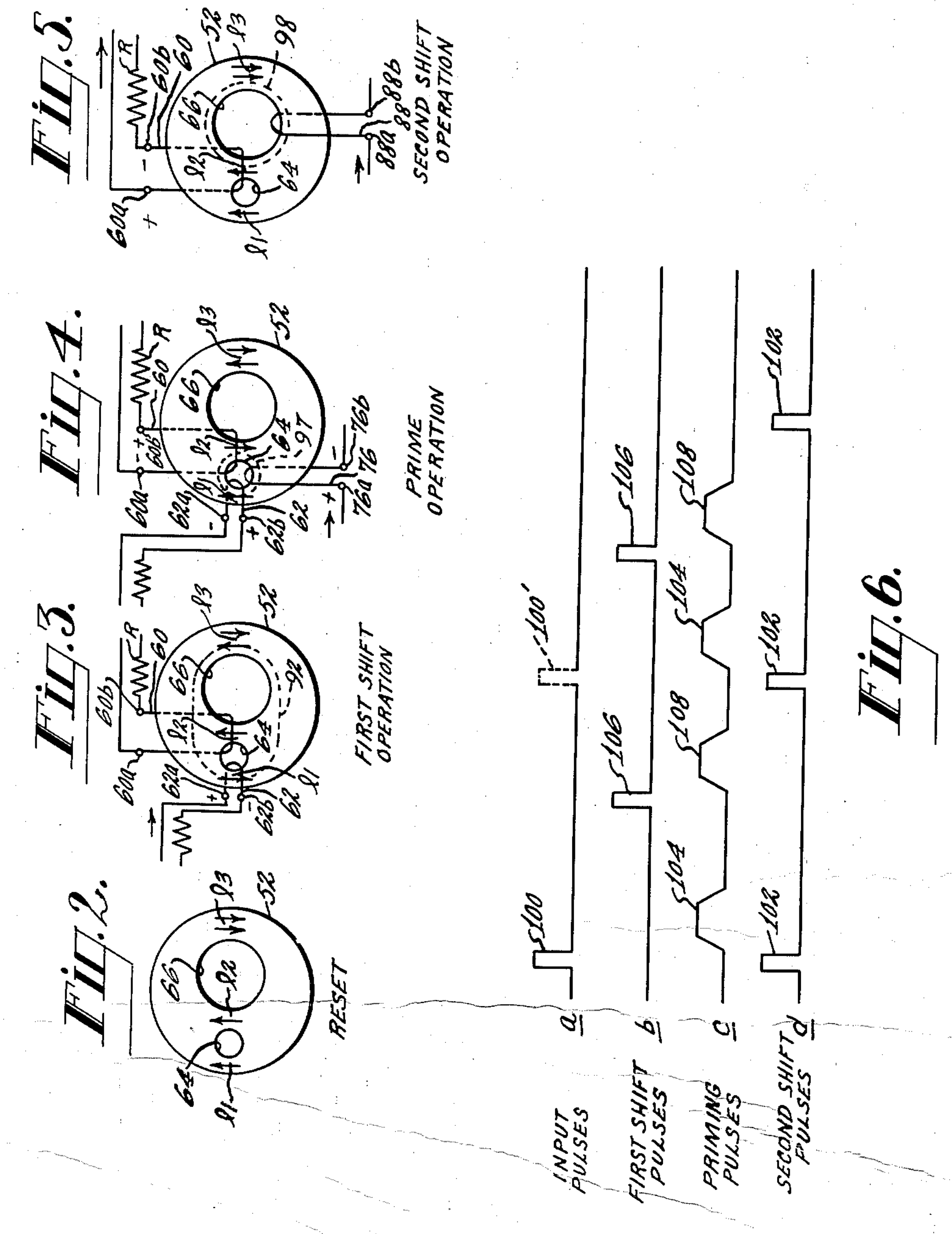
Fig. 6 is a timing diagram useful in explaining the operation of the shift register of Fig. 1.
Figure 1:
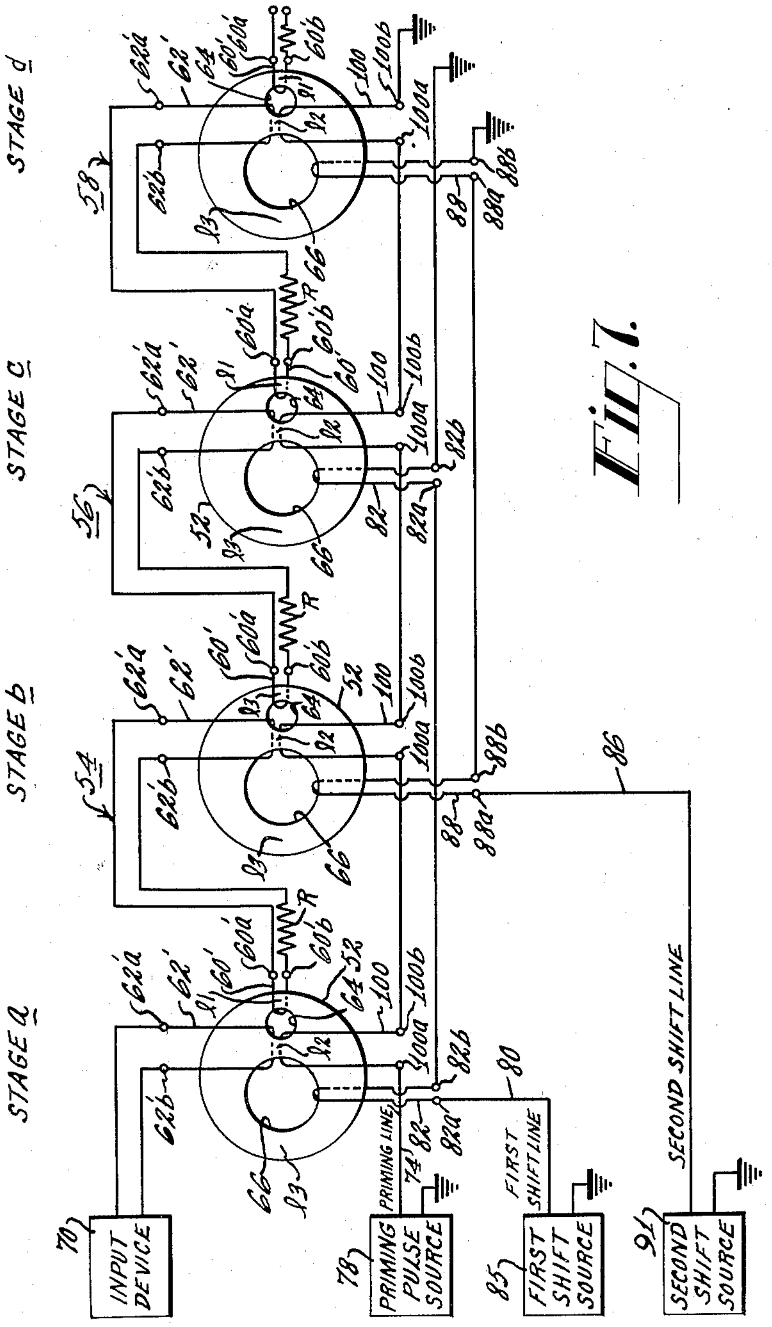

At the start of each cycle of operation, each of the cores 52 is in a reset condition. In Figs. 2 to 5, inclusive, the flux patterns are indicated qualitatively by arrows. Fig. 2 indicates the flux pattern in the legs $l_1$, $l_2$ and $l_3$ of any reset core 52. The flux in each of the legs $l_1$, $l_2$ and $l_3$ is oriented in the clockwise sense, with reference to the larger aperture 66. The flux pattern in any core 52 in its set condition is illustrated, by way of example, in Fig. 3, which shows such a pattern for the core 52 of stage *b*. A core 52 may be changed from its initial reset to its set condition by an input current which flows in its input winding 62 from the terminal **62*a* to the terminal 62*b*. In this application, current flow refers to conventional, rather than electron, current flow. This input current flowing in the input winding 62 produces a flux change in the outside legs $l_1$ and $l_3$ from the clockwise to the counterclockwise sense along a path, indicated by the dotted line 92. Substantially no flux change is produced in the middle leg $l_2$ by the input current because the leg $l_2$ already is saturated in the counterclockwise sense about the smaller aperture 64. Accordingly, when a core 52 is changed from its reset to its set condition, substantially no output voltage is induced across its output winding 60** because of lack of flux change in the leg $l_2$.

A core 52 may be changed from the set to the primed condition by applying a priming current to the priming line 74 in a direction to flow in the core priming winding 76 from any terminal **76*a* to the corresponding terminal 76*b*. The priming current changes the flux in the outside leg $l_1$ and in the middle leg $l_2$ of a set core 52 from the counterclockwise to the clockwise sense about the aperture 64**. Fig. 4 indicates the resultant flux pattern in a primed core, for example the stage *b* core 52, in the primed condition. The priming current produces a flux change along a path indicated by the dotted line 97 of Fig. 4. A voltage is induced across the stage *b* input winding 62 of a polarity to make the terminal **62*b* positive relative to the terminal 62*a*. This induced voltage causes a current flow in the first transfer loop 54**, in a direction to produce a spurious flux change from the clockwise to the counterclockwise sense in the legs $l_2$ and $l_3$ of the stage *a* core 52 along the longer flux path, including the larger aperture 66. This transfer loop current is undesired. The amount of undesired transfer loop current is limited by carrying out the priming operation relatively slowly so that a relatively small-amplitude voltage is induced in the input winding 62 of a primed core 52. The rise time of the leading edge of the priming pulse is made relatively slow. The series resistance element R in each transfer circuit also aids in limiting the amount of undesired transfer loop current to a value less than a predetermined amount required to produce a significant flux change along the longer path of a reset core 52. The voltage induced across the output winding 60 of the stage *b* core 52 during the priming operation is in a direction to make the output winding terminal **60*b* positive relative to the output winding terminal 60*a*. Accordingly, a transfer current flows in the second transfer loop 56. This transfer current is in a direction to drive the succeeding core 52 to its initial reset condition. However, the core 52** of stage *c* already is in its reset condition. Accordingly, substantially no flux change is produced by this transfer current in the stage *c* core 52. This induced current, however, is undesired because it produces a loading effect on the stage *b* core 52 and hinders the priming current from completely changing the flux in its narrow legs $l_1$ and $l_2$. The series-resistance element R in the second transfer loop 56 also limits the amount of undesired current produced in the second transfer loop 56 when the stage *b* core 52 is primed. Sufficient priming current is applied to the stage *b* core 52 to produce a flux reversal in the leg $l_1$ and $l_2$ thereof and to supply the additional transfer currents produced in the first and second transfer loops 54 and 56.

In summary of the priming operation, note that the desired flux change in the core 52 occurs along the shortest path 97 of Fig. 4, including the narrow legs $l_1$ and $l_2$. The flux change in the legs $l_1$ and $l_2$ causes a current to be induced in both transfer circuits coupled to the primed core 52. These transfer currents each act to inhibit the priming current from completely changing the flux in the legs $l_1$ and $l_2$. In particular, the transfer current induced in the transfer circuit, preceding the primed core 52, is in a direction to hold the middle leg $l_2$ of the primed core in its initial direction. If this induced current were sufficiently large, the priming current would produce a spurious flux change along the longest path, including the outside legs $l_1$ and $l_3$ of the primed core. This latter flux change is undesired and would result in improper operation of the shift register. Recall that the priming operation is carried out relatively slowly to reduce the amount of current induced in the transfer circuits during the priming operation. Also, recall that the resistance elements R serve to limit the amount of current flow in the transfer circuits during the priming operation.

By increasing the ratio between the radial dimensions of the smaller aperture 64 and the larger aperture 66, the ratio between the lengths of the desired and the spurious flux paths also is increased. Because of the increased path lengths ratio, more current can be induced in the transfer circuits without any appreciable spurious flux change occurring in the primed core 52. This means that for a priming current of given rise time and duration, smaller resistance elements R can be used in the transfer circuits. Therefore, the operation efficiency of the shift register is improved because, during the fast shift pulses, substantially all the flux change in one core 52 is transferred to a succeeding core 52 and a relatively small amount of energy is dissipated by the transfer circuit resistance elements. In certain instances, when the priming operation is carried out over a relatively long-time interval, the ohmic resistances of the input and the output windings of the transfer circuits are themselves sufficient and no external resistance elements R are required. Experience has shown that good operation is achieved when the priming operation duration is from 10 to 100 times slower than the shift duration, when the shift operation is carried out in, say, 1 to 10 microseconds.

After the priming operation is completed, a shift pulse is applied to transfer the information to succeeding cores. For example, a positive-polarity second shift line signal transfers the stored information from the stage *b* to the stage *c* core 52. The second shift line current flows through the shift winding 88 of the stage *b* core 52 from the terminal **88*a* to the terminal 88*b*. This current flowing in the shift winding 88** produces a flux change in the middle leg $l_2$ and the outside leg $l_3$ of the stage *b* core 52 from the counterclockwise to the clockwise sense, along a path indicated by the dotted line 98 of Fig. 5. The flux change in the stage *b* core 52 induces a voltage across its output winding 60 in a direction to make the terminal **60*a* positive relative to the terminal 60*b*. A resultant transfer current flows in the second transfer loop 56 into the input winding 62 from the terminal 62*a*** of the stage *c* core 52 to the terminal **62*b*** thereof. The stage *c* core 52 is thereby changed from its reset to its set condition. Substantially no voltage is induced in the input winding 62 of the stage *b* core 52 during this shift operation. After the shift operation is completed, the flux in each of the legs $l_1$, $l_2$ and $l_3$ of the stage *b* core 52 is in the initial clockwise sense, corresponding to the reset condition, as illustrated in Fig. 2 or Fig. 5.

The timing diagram of Fig. 6 illustrates the schedule of operating the shift register of Fig. 1. Each positive input pulse 100 from the input source 70 is applied at any time between the initiation of a second shift source pulse and the initiation of the next succeeding priming pulse. The second shift pulses are illustrated by the positive pulses 102 of line *d* of Fig. 6; and the priming pulses are illustrated by the positive pulses 104 of line *c* of Fig. 6. The first shift source pulses, illustrated by the positive pulses 106 of line *b* of Fig. 6, are applied between the termination of a priming pulse 104 and the initiation of the next priming pulse 108 succeeding the priming pulse 104. The second shift source pulses are applied between the termination of a priming pulse 108 and the initiation of the next succeeding priming pulse 104.

Accordingly, during each cycle of operation, each first shift pulse 106 resets the stage *a* and *c* cores 52, when these cores are storing information, and transfers the stored information to the stage *b* and *d* cores 52, respectively. The next succeeding priming pulse 104 changes the stage *b* and *d* cores 52 to their primed condition. Following each alternate priming pulse 108, a second shift pulse 102 resets the stage *b* and *d* cores 52 and transfers the stored information to the stage *c* core 52 and to the output terminals 72, respectively. During the application of a second shift pulse 102, a new input signal from the input source 70 can be applied to the stage *a* core 52. Following each second shift pulse 102, a priming pulse 104 is applied to change the cores 52 of the stages *a* and *c* to their primed conditions, and so on.

In one specific illustrative embodiment of the system of Fig. 1, the following circuit values were used: The dimensions of the cores 52 were the same as those given in Fig. 3 of the aforementioned article by Rajchman and Lo. Each of the input windings 62 were provided with five turns. The priming windings 76 each had a single turn. The output windings 60 each had seven turns wrapped around the middle legs $l_2$ of the different cores 52. Each of the first and second shift windings 82 and 88 had 10 turns. The resistance elements R each were linear elements having a value of 2.7 ohms. Each first and second shift pulse was of one microsecond duration, with 0.2 microsecond rise and fall times, and was varied in amplitude between 1.5 and 2.0 amperes. Each priming pulse was of 24 microseconds duration, with two microsecond rise and fall times, and was varied in amplitude between 0.5 and 1.0 amperes. The input pulses to the cores 52 were of approximately the same characteristics as the shift pulses.

In some instances, particularly where high-speed operation is desired, more turns are used for an output winding 60 than are used for an input winding 62. In such instances, it is more convenient to wrap the output winding on the outside leg $l_1$ of a core 52, and to wrap the input winding 62 on the inside leg $l_2$, as shown in the embodiment of Fig. 7. The functions of the input and the output windings 60 and 62 of Fig. 1 are interchanged. That is, in Fig. 7, windings 62′ (corresponding to windings 60 of Fig. 1) now serve as input windings, and the windings 60′ (corresponding to windings 62 of Fig. 1) now serve as output windings. The priming line 74 is linked to the middle legs $l_2$ of all the cores 52 by means of separate priming windings 100. Beginning at its terminal **100*a*, any priming winding 100 is brought across the top surface of a core 52, then through its larger aperture 66, then across its bottom core surface, and then through its smaller aperture 64 to the terminal 100*b*. The priming line 74 connects the priming windings 100 in series with the terminal 100*b* of one priming winding being connected to the terminal 100*a*** of the next succeeding priming winding. The operation of the system of Fig. 7 is the same as that described for the system of Fig. 1.

Figure 8:
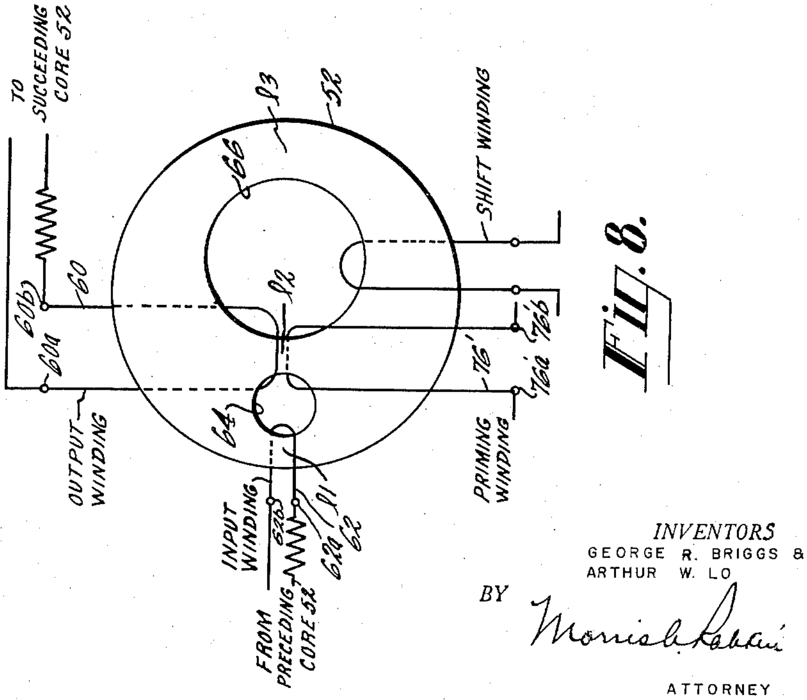
Fig. 8 is a schematic diagram of a single transfluxor core of the shift register of Fig. 1 and illustrating a different way of coupling the input and the output windings.

The system of Fig. 1 also may be modified by linking the priming windings 76 of Fig. 1 to the middle legs $l_2$ of the respective cores 52, as shown for the single core 52 of Fig. 8. The priming winding 76′ of Fig. 8, beginning at its terminal 76′, is brought across the top surface of the core 50, then through the smaller aperture 64, then across the bottom surface of the core 52, and through the larger aperture 66 to the terminal **76′*b*. Note that during a priming operation, the desired flux change occurs along the shortest path 97 (Fig. 4) about the smaller aperture 64, and the spurious flux change occurs along the longer path 98 (Fig. 5) about the larger aperture 66. All other things being equal, a smaller ratio between the diameters of the larger and the smaller apertures 66 and 64 may be used if the priming winding 76′ is linked to the central leg $l_2$ of a core 52, as in Fig. 8, than when the priming winding is wound on the narrow outside leg $l_1$, as in Fig. 1. Observe, however, that in Fig. 8 the priming current is in a direction to produce spurious flux changes in reset ones of the cores 52**, along their longer flux paths, including their legs $l_2$ and $l_3$. Therefore, unlike the system of Fig. 1, a system modified according to Fig. 8 has a maximum permissible amplitude for the priming current.

Figure 9:
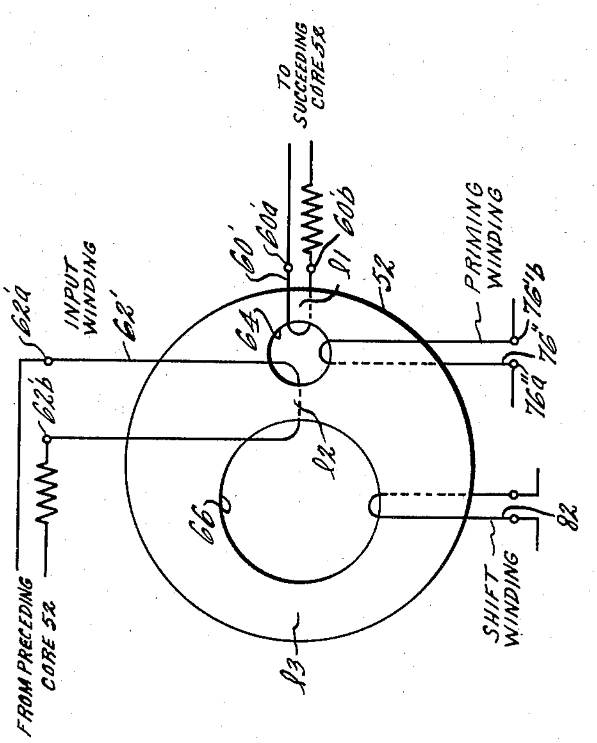
Fig. 9 is a schematic diagram of a single transfluxor core of the shift register of Fig. 7 and illustrating a different way of coupling the input and the output windings.

The system of Fig. 7 also may be modified to reduce the permissible ratio between the diameters of the larger and the smaller apertures 66 and 64 of the cores 52 by threading the priming windings 76″ through the smaller apertures 64 of the respective cores 52, as shown in Fig. 9 for the single core 52. The priming winding 76″ of Fig. 9, beginning at the terminal 76a″, is brought across the bottom surface of the core 52, then through the smaller aperture 64 to the terminal 76″b. Observe that, in Fig. 9, the maximum permissible amplitude of the priming current is limited to the value producing any appreciable flux change along the longest paths of the reset ones of the cores 52.

Figure 10:
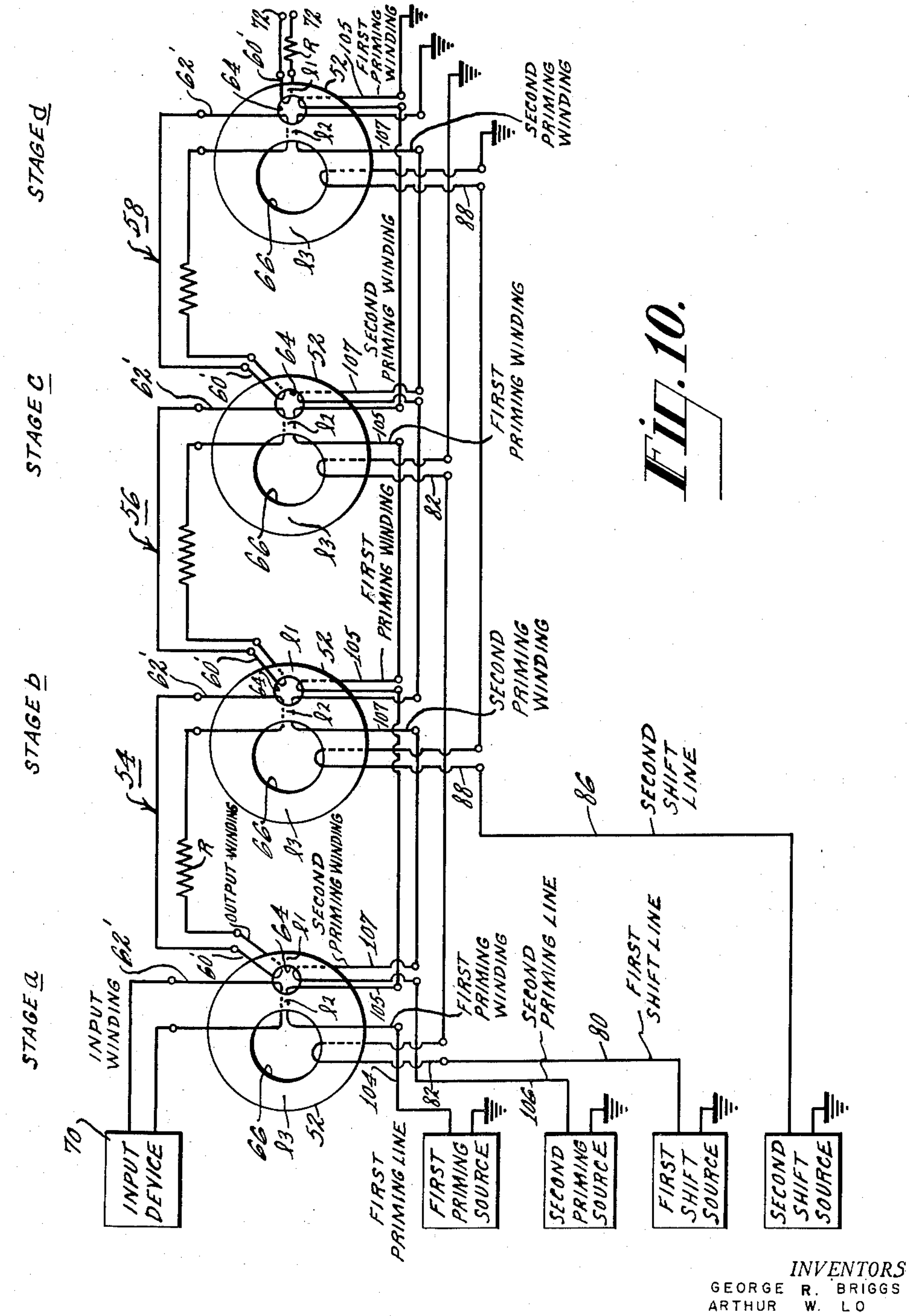
Fig. 10 is a schematic diagram of a shift register according to the invention, using multiple priming and multiple shift lines.

An embodiment of the invention using multiple priming lines is shown in Fig. 10. The system of Fig. 10 is arranged similarly to the system of Fig. 7 except that the priming line 74 of Fig. 7 is replaced in the system of Fig. 10 with first and second priming lines 104 and 106. The first priming line 104 connects the first priming windings 105, each on a different core 52, in series with each other; and the second priming line 106 connects the second priming windings 107, each on alternate, different ones of the cores 52, in series with each other. The first priming windings 105 are linked to the stage *a* and *c* cores 52 through both their apertures 64 and 66, and are linked to the stage *b* and *d* cores 52 through their smaller apertures 64. The second priming windings 107 are linked through the smaller apertures 64 of the stage *a* and *c* cores 52, and are linked through both apertures 64 and 66 of the stage *b* and *d* cores 52.

In operation, each first shift source pulse is followed by a second priming pulse, and each second shift source pulse is followed by a first priming pulse. Assume, for example, that the stage *b* core 52 is in its set condition, after the application of a first shift source pulse. The second priming source pulse applied to the second priming line 106 produces a flux change in the legs $l_2$ and $l_3$ of the stage *b* core 52. This flux change produces a current in the first and second transfer loops 54 and 56. The current flowing in the first transfer loop 54 generates a magnetizing force in a direction to produce a flux change in the legs $l_1$ and $l_3$ of the stage *a* core 52. However, the second priming source pulse flowing in the second priming winding 107 of the stage *a* core 52 generates an opposing magnetizing force in a direction to hold the flux in legs $l_1$ and $l_3$ in the reset direction. Accordingly, the holding magnetizing force applied to any of the cores 52 may be as large as desired without producing spurious flux changes in the cores 52. The current produced in the second transfer loop 56 is not in a direction to produce a flux change in the legs $l_2$ and $l_3$ of the stage *c* core 52. The holding current applied to the second priming winding 107 of the stage *c* core 52, during the second priming operation, generates an opposing magnetizing force in a direction to maintain the flux in legs $l_1$ and $l_3$ of the stage *c* core 52 in the reset direction when the stage *d* core 52 is primed.

Likewise, when the first priming source pulse is applied to the first priming line 104, the cores 52, immediately preceding and succeeding the primed cores, are held in their reset conditions by the holding magnetizing forces generated by the first priming source current flowing in the first priming windings 105.

Figure 11:
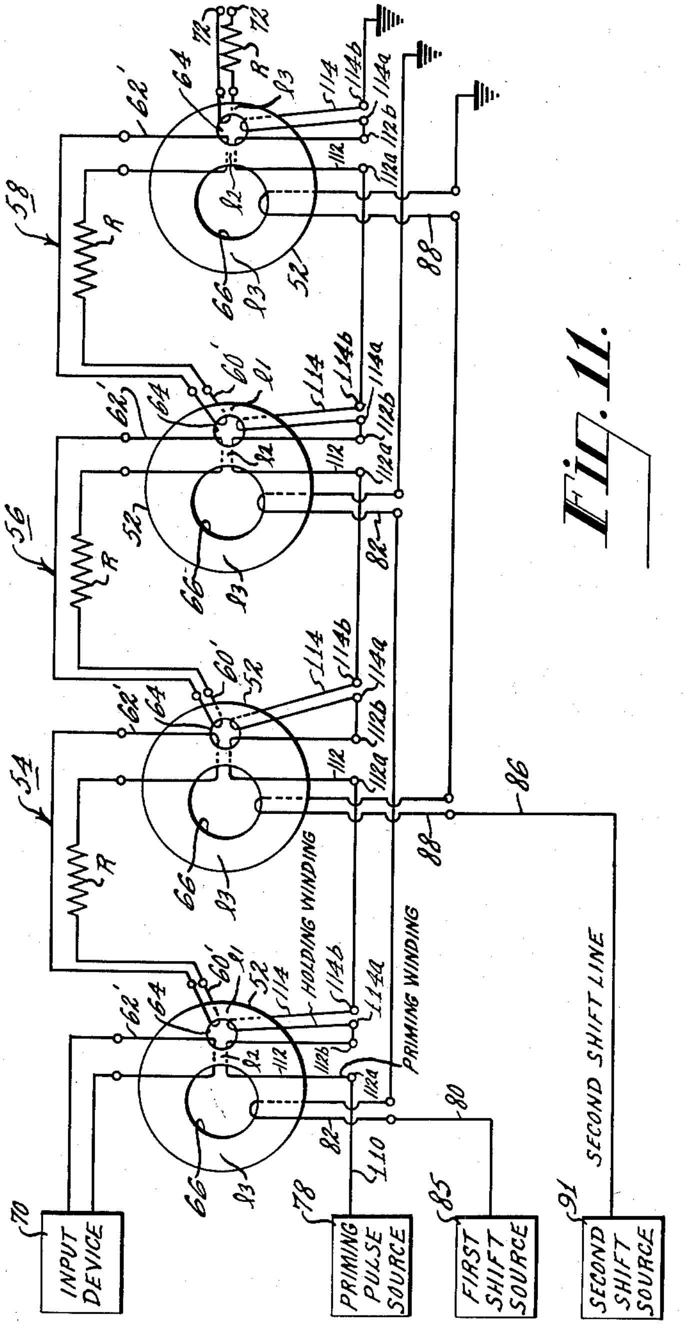
Fig. 11 is a schematic diagram of a shift register using two-apertured transfluxor cores and having a priming line threading both apertures of all the cores.

A single priming line can be used for supplying both priming and holding magnetizing forces, as shown in Fig. 11. The shift register of Fig. 11 is similar to that of Fig. 7 except that, instead of the arrangement of priming line 100 of Fig. 7, a different arrangement of a priming line 110 is used in Fig. 11. The priming line 110 provides the priming magnetizing forces by means of the priming windings 112 that are wound on the middle legs $l_2$ of the cores 52. The holding magnetizing forces are provided by the holding windings 114 that are linked through the smaller aperture 66 of the cores 52. The terminal 112b of a priming winding 112 of a core 52 is connected to the terminal 114a of the holding winding 114 of the same core 52; the terminal 114b of a holding winding 114 of a core 52 is connected to the terminal 112a of the priming winding 112 of the next succeeding core 52, and so on.

Note, however, that the effect of priming and holding magnetizing forces are opposite in the leg $l_3$ of any core 52. The priming magnetizing force is in a direction to change the flux in the leg $l_1$ from the reset, clockwise sense to the primed, counterclockwise sense about the smaller aperture 64, while the holding magnetizing force is in a direction to maintain the flux in the leg $l_1$ in the clockwise sense about the smaller aperture 64. The priming magnetizing force is made greater than the holding magnetizing force by using a larger number of turns for the priming windings 112 than are used for the holding windings 114. Unlike the shift register of Fig. 10, the priming current has a maximum permissible amplitude because the holding magnetizing force also opposes the priming magnetizing force in the middle legs $l_2$ of the set cores 52, while aiding the priming magnetizing force in producing an undesired flux change along the longest path, including the outside legs $l_1$ and $l_3$ of the set cores 52. Accordingly, the holding magnetizing force is limited to a maximum value such that the net magnetizing force acting on a set core 52 is insufficient to produce a flux change along the longest path, including the legs $l_1$ and $l_3$. Observe, however, that the net magnetizing force applied to a set core 52 is sufficient to cause a flux change along the shortest path, including the legs $l_1$ and $l_2$.

If desired, the shift register system of Fig. 1 may be modified as described for the systems of Figs. 10 and 11, respectively, by providing a holding magnetizing force on the outside legs $l_3$ of the cores 52.

Another embodiment of the invention, in the form of a shift register, is illustrated in Fig. 12. The shift register of Fig. 12 uses three-apertured cores 120 each similar to the three-apertured core described in connection with Fig. 17 of the above-mentioned Rajchman and Lo article. The two smaller input and output apertures 122 and 126 are located on either side of the larger central aperture 124 and provide four legs $l_1$, $l_2$, $l_3$ and $l_4$ of equal cross-sectional area. The four cores 120 are connected in a shifting sequence by three transfer loops 128, 130 and 132. The transfer loops connect an output winding 134 threaded through the output aperture 126 of one core 120 in series with an input winding 136 threaded through the input aperture 122 of a succeeding core 120. A separate resistance element 138 is connected in series in each transfer loop. The input winding 136 of the stage *a* core 120 may be connected to a source of input pulses, or may be connected to another transfer loop, such as a transfer loop including the output winding 134 of the stage *d* core 120 and a resistance element 138. The output winding 134 of the stage *d* core 120 may be connected through a resistance element 138 to a separate output device (not shown).

First and second shift lines 140 and 142 are linked to alternate ones of the cores 120 by means of first and second shift windings 141 and 143 threaded through the central apertures 124 of alternate cores 120. A priming line 146 is linked to all the cores 120 by means of first and second priming windings 147 and 148. The first priming windings 147 are threaded through the input apertures 122 of the respective cores 120, and the second priming windings 148 are wound on the legs $l_3$ of the respective cores 120. Beginning at an *a* terminal, any winding, except for the second priming winding 148, is brought across the top surface of a core 120, through a core aperture, and then across the bottom surface of the core 120 to its *b* terminal. Each second priming winding 148, beginning at its *a* terminal, is brought across the top surface of a core 120, then through the larger, central aperture 124, then across the bottom surface of the core 120, then through the smaller output aperture 126 to its *b* terminal.

The first and second shift lines 140 and 142 are connected to sources of first and second shift pulses, and the priming line 146 is connected to a source of priming pulses.

The schedule of operation of the system of Fig. 12 is the same as that of the shift register of Fig. 1. That is, each shift pulse, first and second, is followed by a priming pulse. Input pulses can be applied to the stage *a* core 120 at any time between the initiation of a second shift pulse and the immediately succeeding priming pulse. The first shift source pulses reset the stage *a* and *c* cores 120 and transfer any stored information into the stage *b* and *d* cores 120. The second shift source pulses reset the stage *b* and *d* cores 120 and transfer any stored information to the stage *c* core 120, and to the stage *d* core 120 output winding 134.

Figure 15:
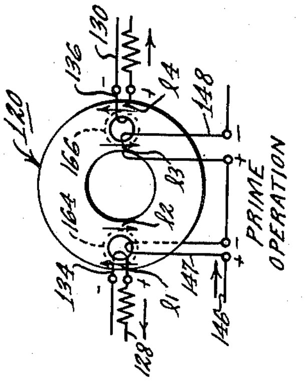
Figure 14:
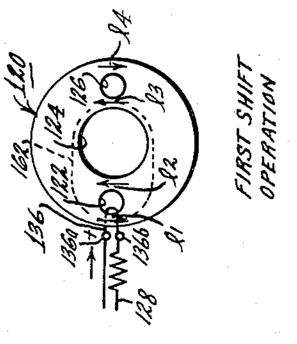
Figure 13:
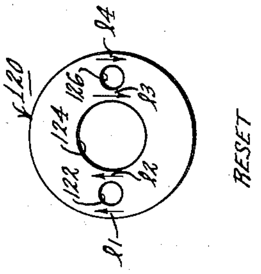

The flux pattern of a core 120 in the reset state is indicated in Fig. 13. The flux is oriented in the clockwise sense, with respect to the central aperture 124, in each of the legs $l_1$, $l_2$, $l_3$ and $l_4$ by a shift pulse that returns the core 120 to its reset condition. Fig. 14 indicates the flux pattern in a core 120 in the set state. A current flowing into the *b* terminal of an input winding 136 changes the flux in the legs $l_1$ and $l_3$ to flux in a counterclockwise sense along a path indicated by the dotted line 162. The flux pattern in a primed core 120 is indicated in Fig. 15. A priming pulse applied to the priming line 146 flows in both the first and the second priming windings 147 and 148. The priming current flowing in the first priming windings 146 changes the direction of flux in the legs $l_1$ and $l_2$ of the set cores 120 to the clockwise sense along a path indicated by the dotted line 164 of Fig. 15. The priming current flowing in the second priming windings 148 changes the direction of flux in the legs $l_3$ and $l_4$ of the set cores 120 to the clockwise sense along a path indicated by the dotted line 166 of Fig. 15. The flux change in the legs $l_1$ and $l_2$ produces a voltage in the input winding 136 (Fig. 12) of a primed core 120 in a direction to cause a clockwise current flow in the winding 136. This induced current flows in the transfer loop, including that winding 136, in a direction to produce a flux change in the legs $l_2$ and $l_4$ of the core 120 preceding the primed core 120. The amount of induced current flowing in any one transfer loop during the priming operation is limited by the resistance element 138 of that loop to a value less than that required to produce a flux change in the legs $l_2$ and $l_4$ of a core 120. The radial dimensions of the apertures are proportioned so that the net priming magnetizing force required to produce a flux change along the smallest path 164 is approximately half, and preferably slightly less than half, the magnetizing force required to produce a spurious flux change along the longer path 162 of Fig. 14. By so proportioning the aperture dimensions, the flux changes during the priming operation are confined to the smallest paths 164 and 166 (Fig. 15) about the smaller apertures 122 and 126, respectively. The flux change along the smallest path 166 produces a voltage in the output winding 134 in a direction to make its *b* terminal positive relative to its *a* terminal. The resulting current flow therefore, is not in a direction to produce a flux change in the core 120 immediately succeeding the primed core 120.

Figure 16:
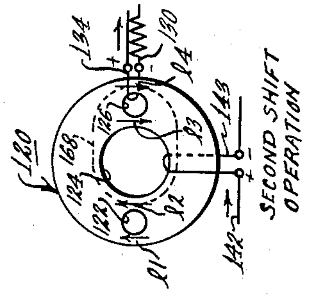

The flux pattern produced in a core 120 during a shift operation is indicated in Fig. 16. The shift source current produces a flux change in a primed core 120 along the path 168, including the legs $l_2$ and $l_4$. This flux change induces a voltage in the output winding 134 in a direction to make its *a* terminal positive relative to its *b* terminal. The resulting current flow in the transfer loop changes the succeeding core 120 from its reset to its set condition. After the shift pulse is terminated, the flux is oriented in the legs $l_1$, $l_2$, $l_3$ and $l_4$ of this core 120 shifted to the reset direction, as shown in Fig. 16 and in Fig. 13.

A schematic diagram of another embodiment of a shift register using three-apertured cores 120 is shown in Fig. 17. The circuit of Fig. 17 differs from that of Fig. 12 in the manner of linking the first priming windings 147 to the cores 120. The first priming windings are wound on the legs $l_2$ of the respective cores 120. One advantage of the circuit of Fig. 17 is that, during the priming operation, the flux change is confined to the middle legs $l_2$ and $l_3$ of the set cores 120. Therefore, substantially no voltages are produced in the input and the output windings 136 and 134 of the primed cores, and substantially no currents flow in the transfer loops coupled to the primed cores 120. Note, however, that the amplitude of the priming current is limited in the system of Fig. 17 because it is in a direction to produce spurious flux changes along a longer path, including the middle leg $l_2$ of the cores 120, that are in the reset state.

Figure 18:
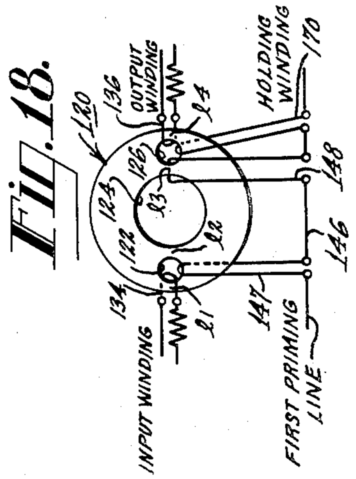

The shift register circuit of Fig. 12 may be modified to provide a holding magnetizing force to prevent spurious flux changes in the outside legs $l_4$ during the priming operation. For example, as shown in the diagram of Fig. 18, each core 120 may be linked by a separate holding winding 170 threaded through its smaller aperture 126. The holding windings 170 are connected in series in the priming line 146. Note that the holding magnetizing force opposes the priming magnetizing force on the legs $l_3$ and $l_4$ adjacent the smaller aperture 126. Accordingly, the maximum amplitude of the holding magnetizing force is limited for the reasons described above in connection with Fig. 11.

Holding magnetizing forces of unlimited amplitude can be used in the system of Fig. 12 by connecting the holding windings 170 to a second priming line 172. The first and second priming lines 146 and 172 link alternate ones of the cores 120 in the manner described for the system of Fig. 10 for the first and second priming lines 104 and 106.

Figure 20:
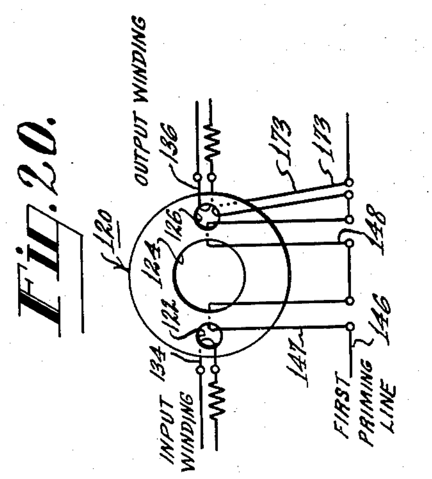
Figure 19:
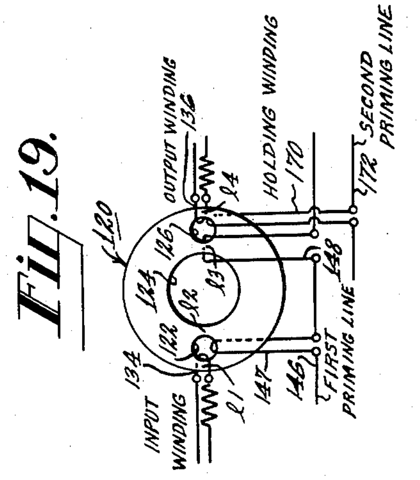
Figure 21:
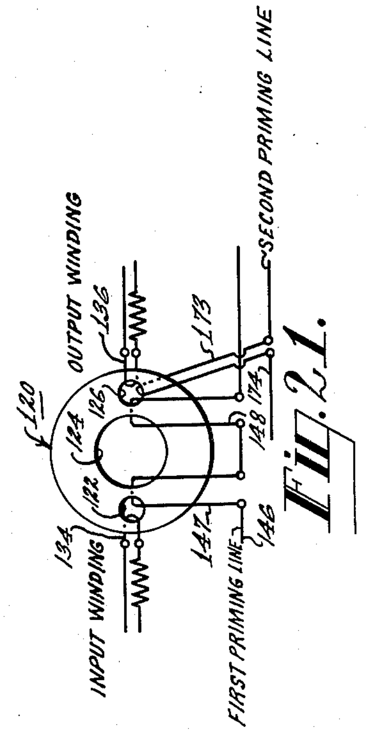

Figs. 20 and 21 each show a modification of the system of Fig. 17 using an additional holding winding 173 (Fig. 20) or additional holding windings 173 and a pair of priming lines (Fig. 21). The second priming winding 174 of Fig. 21 connects the holding windings 173 of alternate cores 120 in series with each other in similar manner to that described for the system of Fig. 10.

Another embodiment of the invention is a shift-register circuit using multiple priming lines and a single shift line for operating two-apertured cores, as shown in Fig. 22. The input winding 62 of a core 52 is wound on the wide leg $l_3$ through the large aperture 66, and the output winding 60' of a core 52 is wound on the narrow outside leg $l_1$ through the smaller aperture 64. The cores 52 are connected in cascade by transfer loops 54, 56 and 58, each including the output winding 60' of one core 52, the input winding 62 of a succeeding core 52, and a resistance element R. A first priming line 176 is formed by connecting a first priming winding 177 in series with a holding winding 178 on each of the stage *a* and *c* cores 52, and connecting these windings in series with the other, similar, first priming windings 179 on each of the stage *b* and *c* cores 52. The first priming windings 177 are wound on the narrow, inside legs $l_2$, and the holding windings 178 are wound on the narrow, outside legs $l_1$ of the stage *a* and *c* cores 52. The other first priming windings 179 are wound on the wide, outside legs $l_3$ of the stage *b* and *d* cores 52. A second priming line 180 is formed by connecting a second priming winding 181 in series with a second holding winding 182 of each of the stage *b* and *d* cores 52, and connecting these windings in series with other second priming windings 183 on the stage *a* and *c* cores 52. The second priming windings 181 are wound on the narrow, inside legs $l_2$, and the second holding windings 182 are wound on the narrow, outside legs $l_1$ of the stage *b* and *c* cores 52, and the other second priming windings 183 are wound on the wide, outside legs $l_3$ of the stage *a* and *c* cores 52. A shift line 184 is formed by connecting shift windings 185, each wound on the narrow, outside leg $l_1$ of a different core 52, in series with each other.

Figure 26:
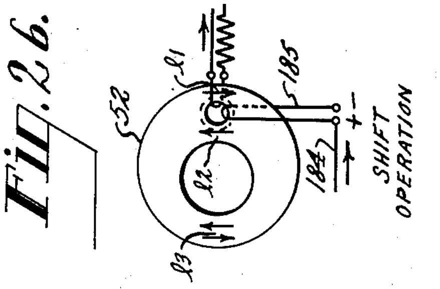
Figure 25:
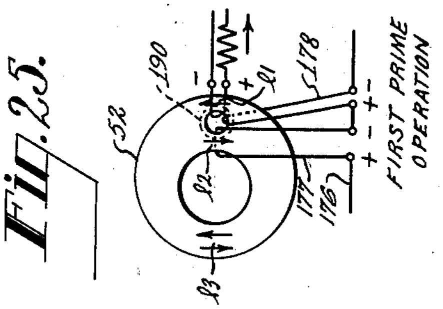
Figure 24:
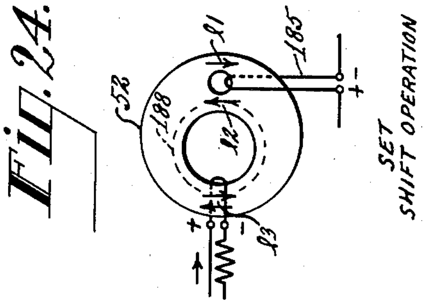
Figure 23:
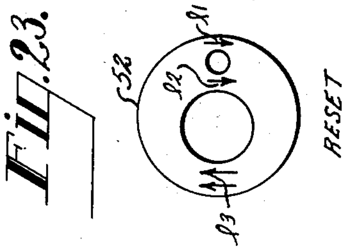
Figure 27:
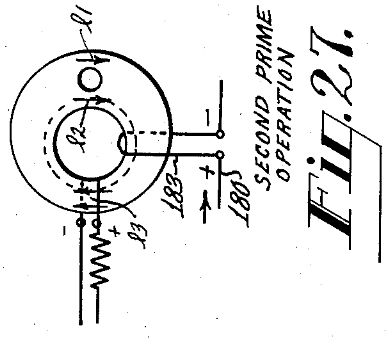

In operation, each shift pulse is followed by one of the first and second priming source pulses, with the priming source pulses being applied alternately to the first and second priming lines 176 and 180. The flux is oriented in all the legs $l_1$, $l_2$ and $l_3$ of a core 52 in one sense, for example, clockwise about the large aperture 66 in the reset condition, as indicated in Fig. 23. Input pulses may be applied to the stage *a* input winding 62 during alternate shift operations to change the stage *a* core 52 from its reset to its set condition. An input pulse applied to an input winding 62 changes the flux in the inside leg $l_2$ and in one-half of the wide leg $l_3$ of a core 52 from the clockwise to the counterclockwise sense along a path indicated by the dotted line 188 of Fig. 24. The shift source pulse flowing in the shift winding 185 of a core 52, when an input pulse is applied, operates to hold the flux in the outside leg $l_3$ of the core 52 receiving the input pulse in its reset direction. Assume, for example, that the stage *a* and *c* cores 52 are in their set conditions. The next first priming source pulse produces a flux change in the legs $l_2$ and $l_1$ of the stage *a* and *c* cores 52, along a path indicated by the dotted line 190 of Fig. 25. The first holding windings 178 are used to prevent spurious flux changes in the outside legs $l_1$ of the stage *a* and *c* cores 52 when the stage *b* and *d* cores 52 are reset by a subsequent first priming pulse. Accordingly, the first priming winding 177 on a core 52 is provided with a greater number of turns than the first holding winding 178 on that same core 52. The next shift source pulse, following the first priming source pulse, produces another flux change in the legs $l_2$ and $l_1$ of the stage *a* and *c* cores 52, as indicated in Fig. 26. The information initially stored in the stage *a* and *c* cores 52 is thereby transferred to the stage *b* and *d* cores 52. Again, the shift source pulse flowing in the shift windings 185 holds the legs $l_1$ of the stage *b* and *d* cores 52 in the reset direction. The following second priming source pulse produces a flux change in the legs $l_3$ and $l_2$ of the stage *a* and *c* cores 52, along the path 188 (Fig. 27) to return the stage *a* and *c* cores 52 to their reset states. The second holding windings 182 (Fig. 22) prevent spurious flux changes in the stage *b* and *d* cores 52, during the second priming operation, by applying a magnetizing force in a direction to hold the outside legs $l_1$ of the stage *b* and *d* cores 52 in their initial states. The second priming source pulse also changes the flux in the legs $l_2$ and $l_1$ of the stage *b* and *d* cores 52, as indicated in Fig. 25. The number of turns of the second holding windings 182, therefore, is made less than the number of turns of the second priming windings 181.

Another modification of a shift register embodying the invention is illustrated in Fig. 28. The system of Fig. 28 is arranged similarly to that of Fig. 22 except that the first and the second priming windings 177 and 181 are wound on the narrow, outside legs $l_1$ of the stage *a* and *c* and *b* and *d* cores 52, respectively; the first and second holding windings 178 and 182 are wound on the wide, outside legs $l_3$ of the stage *a* and *c* and *b* and *d* cores 52, respectively; and the first and second priming windings 178 and 182 are threaded through the large apertures 66 instead of the smaller apertures 64.

The schedule of operation of the system of Fig. 28 is the same as that described for the system of Fig. 22. The priming operation produces a flux change in the narrow legs $l_2$ and $l_1$ of the set cores 52 from the clockwise to the counterclockwise sense about the smaller apertures 52, as in the system of Fig. 22. Spurious flux changes in the legs $l_1$ and $l_3$ of the cores 52 are prevented by the first and second holding windings 178 and 182 which are used to hold the wide legs $l_3$ of the cores 52 in their reset directions. Observe that the holding magnetizing forces generated by the holding windings 178 and 182 during a priming operation are in a direction to oppose a flux change in the middle legs $l_2$ of the set cores 52. Accordingly, for proper operation, the maximum amplitude of the holding magnetizing force is limited to a value less than that required to produce a flux change along the longest path, including the legs $l_1$ and $l_3$ of the set cores 52.

There have been described herein improved shift-register type circuits using transfluxors which require only resistance elements to be used in the transfer loops coupling the various stages. The resistance elements may be linear or non-linear bidirectional current-carrying elements. In the case of a non-linear resistance element such as, for example, cadmium sulphide, relatively little voltage is induced in a transfer circuit during a priming operation. Consequently, the non-linear element exhibits a relatively high value of ohmic resistance and, accordingly, an appreciable portion of the output energy of a primed transfluxor is dissipated across the resistance element. However, during the shift operation, a relatively large voltage is induced in the transfer circuit. Consequently, the non-linear resistance element exhibits a relatively low value of ohmic resistance, and a relatively small amount of the output energy is dissipated across the resistance element.

The improved shift-register circuits described herein include both two and three-apertured transfluxor cores. In certain embodiments, multiple shift and single priming lines are used; in other embodiments multiple shift and multiple priming lines are used and, in still other embodiments, single shift and multiple priming lines are used.

A further advantage in certain circuits of the invention is obtained by using additional holding magnetizing forces to prevent spurious flux changes in the transfluxor cores during operation.

If desired, separate load devices may be connected in series, or in parallel, in each of the different transfer circuits. Also, separate load devices may be coupled to the separate transfluxor cores by an additional output winding (not shown) linked to the transfluxor cores. In such case, non-destructive readout of the pattern of information stored in the shift-register circuit can be obtained. After as many readouts as desired are obtained, the shifting operation can be continued in the manner described.

The output of the highest order stage of a shift-register circuit may be coupled back to the input of the lowest order stage to provide a ring-counter type circuit.

What is claimed is:

1. A magnetic shift register comprising a plurality of transfluxors each having a plurality of apertures including a first aperture and a second aperture, a plurality of transfer circuits connecting said transfluxors in a shifting sequence, each said transfer circuit coupling one said transfluxor through its said first aperture to another succeeding transfluxor through its said second aperture, a priming means linking each of said transfluxors through one or more of said plurality of apertures, and shift means linking each of said transfluxors through one or more of said plurality of apertures for shifting information signals from one of said transfluxors to another one of said transfluxors.

2. A magnetic shift register comprising a plurality of transfluxors each having a first aperture and a second aperture, a plurality of transfer circuits connecting said transfluxors in a shifting sequence, one said transfer circuit being linked through the first aperture of a first of said transfluxors and through the second aperture of a second of said transfluxors, another said transfer circuit being linked through the first aperture of said second transfluxor and through the second aperture of a third of said transfluxors, and so on, a priming means linking all said transfluxors through at least one of said first and second apertures in each of said transfluxors, and shift means linking said transfluxors through at least one of said first and second apertures in each of said transfluxors for shifting information from any one of said transfluxors to the transfluxor succeeding said one transfluxor.

3. A magnetic shift register comprising a plurality of transfluxors each having a first aperture and a second aperture, certain of said apertures of any one transfluxor being of different radial dimensions, a plurality of transfer circuits connecting said transfluxors in a shifting sequence, one said transfer circuit being linked through said first aperture of a first of said transfluxors and through the second aperture of a second of said transfluxors, another said transfer circuit being linked through the first aperture of said second transfluxor and through the second aperture of a third of said transfluxors, and so on, a priming means linking all said transfluxors through at least one of said apertures in each of said transfluxors, and shift means linking said transfluxors through at least one of said first and second apertures in each of said transfluxors for shifting information from any one of said transfluxors to the transfluxor succeeding said one transfluxor.

4. A magnetic shift register comprising a plurality of transfluxors each having a first aperture, a second aperture, and a third aperture, a plurality of transfer circuits connecting said transfluxors in a shifting sequence, one said transfer circuit being linked through the first aperture of a first of said transfluxors and through the second aperture of a second of said transfluxors, another said transfer circuit being linked through the first aperture of said second transfluxor and through the second aperture of a third of said transfluxors, and so on, priming means linking each of said transfluxors through one or more of said apertures and shift means linking said transfluxors through said third apertures for shifting information from any one of said transfluxors to the transfluxor succeeding said one transfluxor.

5. A magnetic shift register comprising a plurality of transfluxors each having first and second apertures, a plurality of transfer circuits connecting said transfluxors in cascade, one transfer circuit being linked through said first and second apertures of first and second of said transfluxors, respectively, another transfer circuit being linked through said first and second apertures of said second and a third of said transfluxors, respectively, and so on, priming means linking each of said transfluxors through one or more of said apertures and first and second shift lines alternately linking said transfluxors through said first apertures.

6. A magnetic shift register comprising a plurality of transfluxors each having apertures, input and output windings each linked through a different one of said transfluxor apertures, transfer circuits connecting said transfluxors in a shifting sequence, each said transfer circuit consisting of a resistive connection between the output winding of one transfluxor and the input winding of a succeeding transfluxor, priming means linking each of said transfluxors through one or more of said apertures, and shift means coupled to said transfluxors through one or more of said apertures for shifting an information signal from one of said transfluxors to another of said transfluxors.

7. A magnetic shift register comprising a plurality of transfluxors having apertures, separate input and output windings each linked through a different one of said transfluxor apertures, transfer circuits connecting said transfluxors in a shifting sequence, each said transfer circuit consisting of a resistive connection between the output winding of one transfluxor and the input winding of a succeeding transfluxor, first and second shift lines linking alternate ones of said transfluxors through a first aperture in each said transfluxor, and a priming line linking all said transfluxors through said first and a second of said apertures in each of said transfluxors.

8. A magnetic shift register comprising a plurality of transfluxors each having a first aperture and a second aperture, certain of said apertures of any one core being of different radial dimensions, a plurality of transfer circuits connecting said transfluxors in a shifting sequence, one said transfer circuit being linked through the first aperture of a first of said transfluxors and through the second aperture of a second of said transfluxors, another said transfer circuit being linked through the first aperture of said second transfluxor and through the second aperture of a third of said transfluxors, and so on, priming means linking all said transfluxors through at least one of said apertures, a first shift line linking alternate ones of said transfluxors through one or more of said apertures, and a second shift line linking the other alternate ones of said transfluxors.

9. A magnetic shift register comprising a plurality of transfluxors each having apertures, separate input and output windings each linked through a different one of said transfluxor apertures, transfer circuits connecting said transfluxors in a shifting sequence, each said transfer circuit comprising a resistive connection between the output winding of one transfluxor and the input winding of a succeeding transfluxor, a priming line linking all said transfluxors through one or more of said apertures, and shift means linking each of said transfluxors through at least one of said apertures thereof for applying a shift signal to said transfluxors for shifting an information signal from any one of said transfluxors to the transfluxor succeeding said one transfluxor.

10. A magnetic shift register comprising a plurality of transfluxors each having apertures, separate input and output windings each linked through a different one of said transfluxor apertures, transfer circuits connecting said transfluxors in a shifting sequence, each said transfer circuit comprising a resistive connection between the output winding of one transfluxor and the input winding of a succeeding transfluxor, a priming line linking each of said transfluxors through one or more of said apertures thereof, and shift means linking each of said transfluxors through at least one aperture thereof for applying a shift signal to one of said transfluxors for shifting information through the transfer circuit connecting said one transfluxor and another.

11. A magnetic shift register comprising a plurality of transfluxors each having apertures, separate input and output windings each linked through a different one of said transfluxor apertures, transfer circuits connecting said transfluxors in a shifting sequence, each said transfer circuit comprising an element having substantially equal bidirectional current-carrying characteristics connecting the output winding of one transfluxor and the input winding of a succeeding transfluxor, a priming line linking each of said transfluxors through at least one aperture thereof, and shift means linking each of said transfluxors through at least one aperture thereof for applying a shift signal to said transfluxors for shifting an information signal from any one of said transfluxors to the transfluxor succeeding said one transfluxor.

12. A magnetic shift register comprising a plurality of transfluxors each having apertures, separate input and output windings each linked through a different one of said transfluxor apertures, transfer circuits connecting said transfluxors in a shifting sequence, each said transfer circuit comprising a non-linear element having substantially equal bidirectional current-carrying characteristics connecting the output winding of one transfluxor and the input winding of a succeeding transfluxor, a priming line linking each of said transfluxors through at least one aperture thereof, and shift means linking each of said transfluxors through at least one aperture thereof for applying a shift signal to said transfluxors for shifting an information signal from any one of said transfluxors to the transfluxor succeeding said one transfluxor.

13. A magnetic shift register comprising a plurality of transfluxors each having a setting and an output aperture, transfer circuits connecting said transfluxors in cascade, any one of said transfer circuits coupling any two succeeding ones of said transfluxors by being linked through the output aperture of one and the setting aperture of the other, a priming line linking all said transfluxors through their said setting apertures, and first and second shift lines linking alternate ones of said transfluxors through their said output apertures.

14. A magnetic shift register comprising a plurality of transfluxors each having a setting and an output aperture, transfer circuits between said transfluxors, a first of said transfluxors being paired with a second, said second being paired with a third, and so on, any one of said transfer circuits being coupled through said output aperture of one transfluxor of a pair and through said setting aperture of the other transfluxor of the same one pair, a priming line linked through said setting aperture of each of said transfluxors, and shift means linking all of said transfluxors through at least one aperture in each of said transfluxors.

15. A magnetic shift register comprising a plurality of transfluxors each having a setting and an output aperture, transfer circuits between said transfluxors, a first of said transfluxors being paired with a second, said second being paired with a third, and so on, any one of said transfer circuits being coupled through said output aperture of one transfluxor of a pair and through said setting aperture of the other transfluxor of the same one pair, a priming line linking each of said transfluxors through at least one said aperture thereof, and shift means linking each of said transfluxors through at least one said aperture thereof.

16. A magnetic shift register comprising a plurality of transfluxors each having a setting and an output aperture, transfer circuits between said transfluxors, a first of said transfluxors being paired with a second, said second being paired with a third, and so on, any one of said transfer circuits being coupled through said output aperture of one transfluxor of a pair and through said setting aperture of the other transfluxor of the same one pair, a priming line linked through both said setting and output apertures of all said transfluxors, and first and second shift lines linking alternate ones of said transfluxors through at least one of said apertures in each of said transfluxors.

17. A magnetic shift register comprising a plurality of transfluxors each having a setting and an output aperture, transfer circuits between said transfluxors, a first of said transfluxors being paired with a second, said second being paired with a third, and so on, any one of said transfer circuits being coupled through said output aperture of one transfluxor of a pair and through said setting aperture of the other transfluxor of the same one pair, a priming means linked through both said setting and output apertures of all said transfluxors, and shift means linking all of said transfluxors.

18. A magnetic shift register comprising a plurality of transfluxors each having a setting and an output aperture, transfer circuits between said transfluxors, a first of said transfluxors being paired with a second, said second being paired with a third, and so on, any one of said transfer circuits being coupled through said output aperture of one transfluxor of a pair and through said setting aperture of the other transfluxor of the same one pair, first and second priming lines linking alternate ones of said transfluxors through at least one of their said apertures, and shift means linking each of said transfluxors through at least one of said apertures.

19. A magnetic shifting circuit comprising a plurality of transfluxors each having two apertures, and each having set, prime and reset conditions, a plurality of transfer circuits, a first said transfer circuit coupling a first and a second of said transfluxors, a second said transfer circuit coupling said second and a third of said transfluxors, and so on, priming means coupled to said transfluxors through at least one aperture thereof for changing one or more of said transfluxors from their set to their primed conditions, and shift means coupled to said transfluxors through at least one aperture thereof for changing said one or more transfluxors to their reset condition, said one or more transfluxors inducing signals in their coupled said transfer circuits to change one or more other transfluxors from their reset to their set conditions.

20. A magnetic shifting circuit comprising a plurality of transfluxors each having two apertures, and each having set, prime and reset conditions, a plurality of transfer circuits, a first said transfer circuit coupling a first and a second of said transfluxors, a second said transfer circuit coupling said second and a third of said transfluxors, and so on, priming means coupled to said transfluxors for changing one or more of said transfluxors from their set to their primed conditions, means for applying holding magnetizing forces to said transfluxors to prevent undesired flux changes in other transfluxors when said one or more transfluxors are changed to their primed conditions, and shift means coupled to each of said transfluxors through at least one of said apertures for changing said one or more transfluxors to their reset condition, said one or more transfluxors inducing signals in their coupled said transfer circuits to change one or more other transfluxors from their reset to their set conditions.

References Cited in the file of this patent

UNITED STATES PATENTS

| | | |
|---|---|---|
| 2,708,722 | An Wang | May 17, 1955 |
| 2,802,953 | Arsenault et al. | Aug. 13, 1957 |
| 2,803,812 | Rajchman et al. | Aug. 20, 1957 |

OTHER REFERENCES

Proceedings of the IRE, vol. 44, issue 3, pp. 321–332, March 1956, "The Transfluxor," by Rajchman et al.